(12) United States Patent
Arkhipov

(10) Patent No.: US 8,522,133 B2
(45) Date of Patent: Aug. 27, 2013

(54) INCREMENTALLY TOKENIZING AND/OR PARSING A STYLE SHEET

(75) Inventor: Mikhail E. Arkhipov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 13/161,997

(22) Filed: Jun. 16, 2011

(65) Prior Publication Data

US 2012/0324340 A1    Dec. 20, 2012

(51) Int. Cl.
*G06F 17/00* (2006.01)
(52) U.S. Cl.
USPC ............ 715/235; 715/234; 715/236; 715/237
(58) Field of Classification Search
USPC .................................. 715/234, 235, 236, 237
See application file for complete search history.

(56) References Cited

U.S. PATENT DOCUMENTS

| | | | |
|---|---|---|---|
| 5,813,019 A | 9/1998 | Van De Vanter | |
| 6,941,511 B1 | 9/2005 | Hind et al. | |
| 7,143,103 B1 * | 11/2006 | Zisman et al. | 1/1 |
| 7,143,344 B2 * | 11/2006 | Parker et al. | 715/236 |
| 7,281,018 B1 | 10/2007 | Begun et al. | |
| 7,383,498 B1 * | 6/2008 | Hickl et al. | 715/235 |
| 7,596,747 B2 | 9/2009 | Spada | |
| 2007/0143672 A1 * | 6/2007 | Lipton et al. | 715/530 |
| 2008/0098296 A1 * | 4/2008 | Brichford et al. | 715/234 |
| 2009/0012777 A1 | 1/2009 | Ie et al. | |

OTHER PUBLICATIONS

Bernardy, Jean-Philippe, "Lazy Functional Incremental Parsing", Retrieved at <<http://www.cse.chalmers.se/~bernardy/FunctionalIncrementalParsing.pdf>>, Proceedings of the 2nd ACM SIGPLAN symposium on Haskell, Mar. 2, 2009, pp. 1-12.

Lam, et al., "XML Document Parsing: Operational and Performance Characteristics", Retrieved at <<http://www.fdi.ucm.es/profesor/jlsierra/e-learning/segunda-sesion/XMLParsingModels.pdf>>, vol. 41 No. 9, Sep. 2008, pp. 30-37.

* cited by examiner

*Primary Examiner* — Stephen Hong
*Assistant Examiner* — Matthew Ludwig

(57) ABSTRACT

Techniques are described herein that are capable of incrementally tokenizing and/or parsing a style sheet. For example, tokens may be created to represent respective sequences of characters in a style sheet. A token that includes a change (a.k.a. a changed token) and other token(s) that follow the changed token may be re-tokenized and/or parsed without re-tokenizing and/or parsing token(s) that precede the changed token. In another example, hierarchical node trees may be used to represent a style sheet. Each of the hierarchical node trees includes a respective subset of tokens, which are assigned among various hierarchical levels of the respective hierarchical node tree. Each of the tokens has a respective absolute or relative character position that indicates a location in the style sheet of the sequence of characters that is represented by the respective token. Absolute character positions may be updated without updating the relative character positions.

20 Claims, 5 Drawing Sheets

INCREMENTALLY TOKENIZING AND/OR PARSING A STYLE SHEET

BACKGROUND

Style sheets are commonly used to define the layout of documents. For instance, a style sheet may specify various parameters and corresponding values that are associated with the layout of a document (or a type of document). For instance, a first style sheet may be associated with business letters, a second style sheet may be associated with personal letters, a third style sheet may be associated with business reports, and so on. Examples of parameters that may be specified by a style sheet include but are not limited to page size, margins, fonts, and how headers and/or links appear in a document.

One exemplary type of style sheet is referred to as a cascading style sheet (CSS). A cascading style sheet defines the layout of a document that is written in a markup language. Examples of a markup language include but are not limited to hypertext markup language (HTML), extensible HTML (XHTML), plain old extensible markup language (PDX), scalable vector graphics (SVG), and XML user interface language (XUL). Cascading style sheets often are used to define presentation semantics (e.g., the look and/or formatting) of web pages.

Modern style sheet editors, including CSS editors, provide features including but not limited to syntax coloring, statement completion, document structure analysis, and validation of a document against standards (e.g., web standards). Such features often are provided in real-time as a user is making edits to the document. It may be desirable for processing (e.g., tokenizing, parsing, etc.) of the style sheet to occur at a relatively rapid pace. However, some types of processing, such as tokenizing and parsing, traditionally are performed with respect to an entire document. Accordingly, conventional techniques for processing a document may consume substantial time and/or resources of a computing system (e.g., a computer). Moreover, conventional techniques may not be capable of tokenizing and/or parsing the document in real-time as a user makes edits to the document, especially when the document includes tens, hundreds, or more kilobytes of data.

SUMMARY

Various approaches are described herein for, among other things, incrementally tokenizing and/or parsing a style sheet. For example, tokens may be created to represent respective sequences of characters in a style sheet. A token is an integer representation of a sequence of characters. A token that includes a change (a.k.a. a changed token) and other token(s) that follow the changed token may be re-tokenized and/or parsed without re-tokenizing and/or parsing token(s) that precede the changed token.

In another example, hierarchical node trees may be used to represent a style sheet. In accordance with this example, each hierarchical node tree is defined by hierarchical levels that include nodes among which a respective subset of the tokens in the style sheet is included. Each of the tokens has a respective character position (e.g., carent) that indicates a location in the style sheet of the sequence of characters that is represented by the respective token. Each of the nodes has a respective character position that indicates a location of that node in the style sheet. Each token and each node in a hierarchical node tree may have an absolute character position or a relative character position. An absolute character position is defined as an absolute position of a token or a node in a style sheet. A relative character position is a position of a token or a node in a style sheet that is defined relative to another character position that corresponds to another token or node. Some tokens that follow a changed token may have absolute character positions, and other tokens that follow the changed token may have relative character positions that are based on those absolute character positions. Some nodes that follow a designated node that includes a changed token may have absolute character positions, and other nodes that follow the designated node may have relative character positions that are based on those absolute character positions. The absolute character positions may be updated without updating the relative character positions in response to a change that results in the changed token.

Root nodes in at least some of the hierarchical node trees may have absolute character positions, and non-root nodes in those hierarchical node trees may have relative character positions that are based on the absolute character positions of the respective root nodes. A root node is a node that is included in a highest hierarchical level of a hierarchical node tree. A non-root node is a node that is included in a hierarchical level of a hierarchical node tree other than a highest hierarchical level of the hierarchical node tree.

A method is described in which a sequence of tokens is generated. Each token is an integer representation of a respective sequence of characters that is included in a style sheet. Each token corresponds to a respective character position in the style sheet. A designated token in the sequence of tokens that includes a user-initiated change is identified. The designated token follows a first subset of the tokens in the sequence of tokens and precedes a second subset of the tokens in the sequence of tokens. A determination is made whether the user-initiated change is identified as a type of change that changes no attributes, other than the character positions, of the tokens in the second subset of the tokens. A determination is made that the second subset of the tokens is not to be re-tokenized if the user-initiated change is identified as a type of change that changes no attributes, other than the character positions, of the tokens in the second subset of the tokens. A determination is made that the second subset of the tokens is to be re-tokenized if the user-initiated change is not identified as a type of change that changes no attributes, other than the character positions, of the tokens in the second subset of the tokens.

Another method is described in which specified subsets of tokens from a sequence of tokens are assigned to respective hierarchical node trees. Each hierarchical node tree is defined by hierarchical nodes among which the tokens in the respective specified subset are included. Each of the hierarchical nodes has a respective character position. In a changed hierarchical node tree having a root node and sub-root node(s), character position(s) of the sub-root node(s) that follow a sub-root node that includes the user-initiated change are updated and a character position of the root node is not updated. In each hierarchical node tree that follows the changed hierarchical node tree, a character position of a root node, and not relative character positions of sub-root nodes, is updated to take into account the user-initiated change.

A system is described that includes token generation logic, token identification logic, and determination logic. The token generation logic is configured to generate a sequence of tokens. Each token is an integer representation of a respective sequence of characters that is included in a style sheet. Each token corresponds to a respective character position in the style sheet. The token identification logic is configured to identify a designated token in the sequence of tokens that includes a user-initiated change. The designated token follows a first subset of the tokens in the sequence of tokens and precedes a second subset of the tokens in the sequence of tokens. The determination logic is configured to determine whether the user-initiated change is identified as a type of change that changes no attributes, other than the character positions, of the tokens in the second subset of the tokens. The determination logic is further configured to determine that the second subset of the tokens is not to be re-tokenized in response to the user-initiated change being identified as a type of change that changes no attributes, other than the character positions, of the tokens in the second subset of the tokens. The determination logic is further configured to determine that the second subset of the tokens is to be re-tokenized in response to the user-initiated change not being identified as a type of change that changes no attributes, other than the character positions, of the tokens in the second subset of the tokens.

A computer program product is described that comprises a computer-readable medium having computer program logic recorded thereon for enabling a processor-based system to incrementally process a style sheet. The computer program product comprises a first program logic module, a second program logic module, a third program logic module, a fourth program logic module, and a fifth program logic module. The first program logic module is for enabling the processor-based system to generate a sequence of tokens. Each token is an integer representation of a respective sequence of characters that is included in a style sheet. The second program logic module is for enabling the processor-based system to assign specified subsets of the sequence of tokens to respective hierarchical node trees. Each hierarchical node tree is defined by hierarchical nodes among which the tokens in the respective specified subset are included. Each of the hierarchical nodes has a respective character position. The third program logic module is for enabling the processor-based system to identify a designated token that includes a user-initiated change in a designated hierarchical node tree. The designated token is included in a designated node following a first subset of the nodes in the designated hierarchical node tree and preceding a second subset of the nodes in the designated hierarchical node tree. The fourth program logic module is for enabling the processor-based system to determine whether the user-initiated change is identified as a type of change that changes no attributes, other than the character positions, of the nodes in the second subset of the nodes. The fifth program logic module is for enabling the processor-based system to determine that the tokens in the second subset of the nodes are not to be re-tokenized in response to the user-initiated change being identified as a type of change that changes no attributes, other than the character positions, of the nodes in the second subset of the nodes. The fifth program logic module also is for enabling the processor-based system to determine that the tokens in the second subset of the nodes are to be re-tokenized in response to the user-initiated change not being identified as a type of change that changes no attributes, other than the character positions, of the nodes in the second subset of the nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1A:
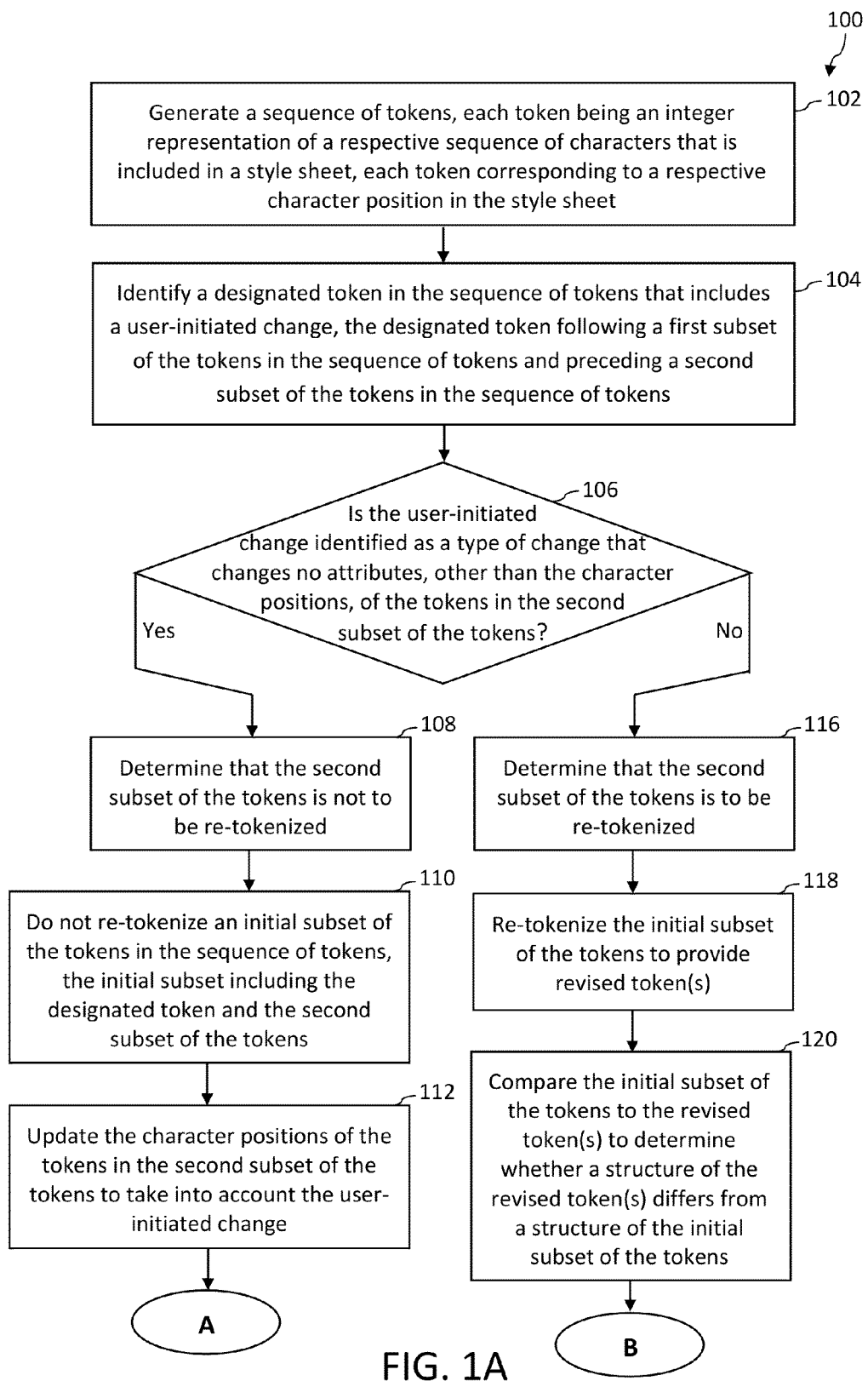
FIGS. 1A and 1B depict respective portions of a flowchart of an example method for incrementally processing a style sheet in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of incrementally tokenizing and/or parsing a style sheet. In accordance with some example embodiment, tokens are created to represent respective sequences of characters in a style sheet. A token is an integer representation of a sequence of characters. For example, a token may represent a sequence of characters that designate opening of a comment (e.g., /*), closing of a comment (e.g., */), a number, an identifier, an "open block" character (e.g., {) a "close block" character (e.g., }), etc. Accordingly, a token may be any suitable type of token. For instance, a token that represents a sequence of characters that designate opening of a comment may be referred to as a "comment opening" token; a token that represents a sequence of characters that designate closing of a comment may be referred to as a "comment closing" token; a token that represents a sequence of characters that designate a number may be referred to as a "number" token, and so on. In accordance with these example embodiments, a token that includes a change (a.k.a. a changed token) and other token(s) that follow the changed token may be re-tokenized and/or parsed without re-tokenizing and/or parsing token(s) that precede the changed token.

In accordance with some example embodiments, hierarchical node trees are used to represent a style sheet. Each hierarchical node tree is defined by hierarchical levels that include nodes among which a respective subset of the tokens in the style sheet is included. Each of the tokens has a respective character position (e.g., carent) that indicates a location in the style sheet of the sequence of characters that is represented by the respective token. Each of the nodes has a respective character position that indicates a location of that node in the style sheet. In accordance with these example embodiments, each token and each node in a hierarchical node tree may have an absolute character position or a relative character position. An absolute character position is defined as an absolute position of a token or a node in a style sheet. A relative character position is a position of a token or a node in a style sheet that is defined relative to another character position that corresponds to another token or node. For instance, if a first node is located at a ninth character position in a style sheet and a second node is located at a fourteenth character position in the style sheet, the first node may have an absolute character position of nine and the second node may have a relative character position of five with respect to the character position of the first node. Alternatively, the first node may have an absolute character position of nine and the second node may have an absolute character position of fourteen.

Some tokens that follow a changed token may have absolute character positions, and other tokens that follow the changed token may have relative character positions that are based on those absolute character positions. Some nodes that follow a designated node that includes a changed token may have absolute character positions, and other nodes that follow the designated node may have relative character positions that are based on those absolute character positions. The absolute character positions may be updated without updating the relative character positions in response to a change that results in the changed token.

In accordance with an example embodiment, root nodes in at least some of the hierarchical node trees have absolute character positions, and non-root nodes in those hierarchical node trees have relative character positions that are based on the absolute character positions of the respective root nodes. A root node is a node that is included in a highest hierarchical level of a hierarchical node tree. A non-root node is a token that is included in a hierarchical level of a hierarchical node tree other than a highest hierarchical level of the hierarchical node tree.

Example techniques described herein have a variety of benefits as compared to conventional techniques for processing a style sheet. For instance, the example techniques may consume less time and/or fewer resources of a computing system (e.g., a computer) than conventional techniques. Moreover, the example techniques may be capable of tokenizing and/or parsing a document in real-time as a user makes edits to the document. Analyzing a style sheet on a token-by-token basis may be faster than analyzing the style sheet on a character-by-character basis. Tokens that precede a changed token (i.e., a token in which a change occurs) need not necessarily be re-tokenized and/or parsed (e.g., even if the change modifies a structure of the changed token and/or the tokens that follow the changed token). The changed token and/or tokens that follow the changed token need not necessarily be re-tokenized and/or parsed if the change in the changed token doesn't change attributes other than character positions of the tokens that follow the changed token. The example techniques may be capable of analyzing changes made to a style sheet since a most recent tokenizing and/or parsing operation was performed with respect to the style sheet. Accordingly, tokenizing and/or parsing information that is associated with the style sheet may be updated incrementally.

Figure 1B:
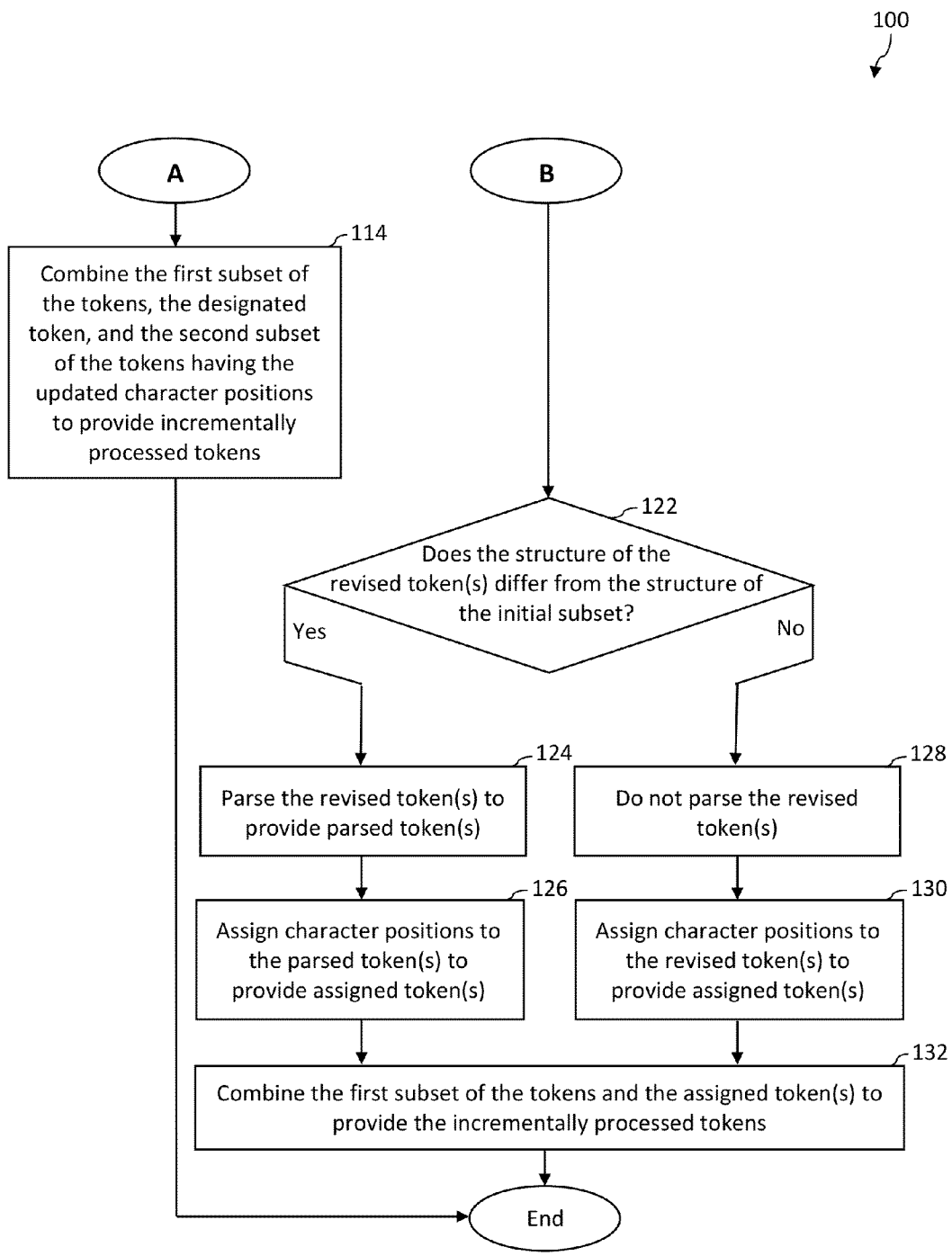
Figure 2:
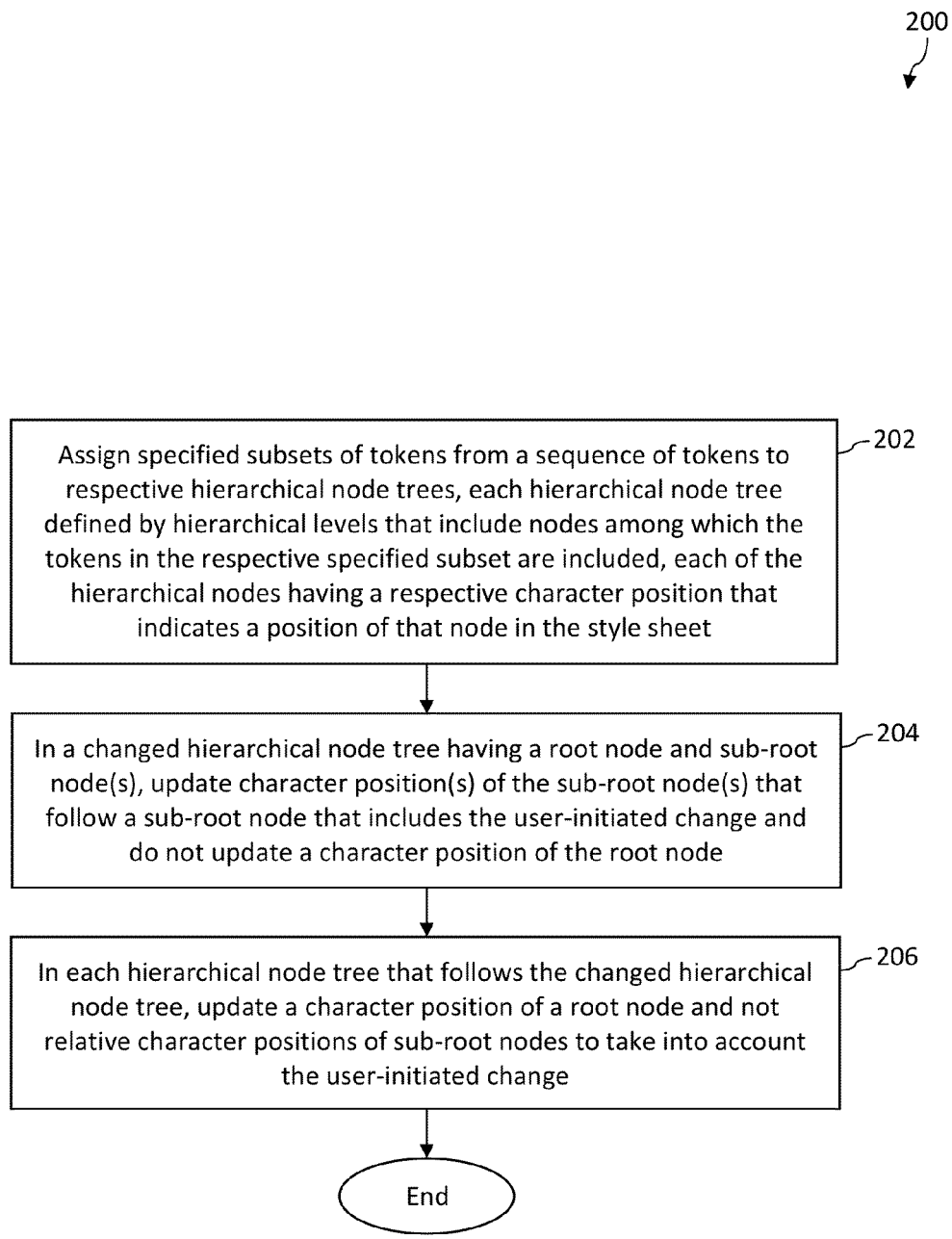
FIG. 2 depicts a flowchart of another example method for incrementally processing a style sheet in accordance with an embodiment.
Figure 3:
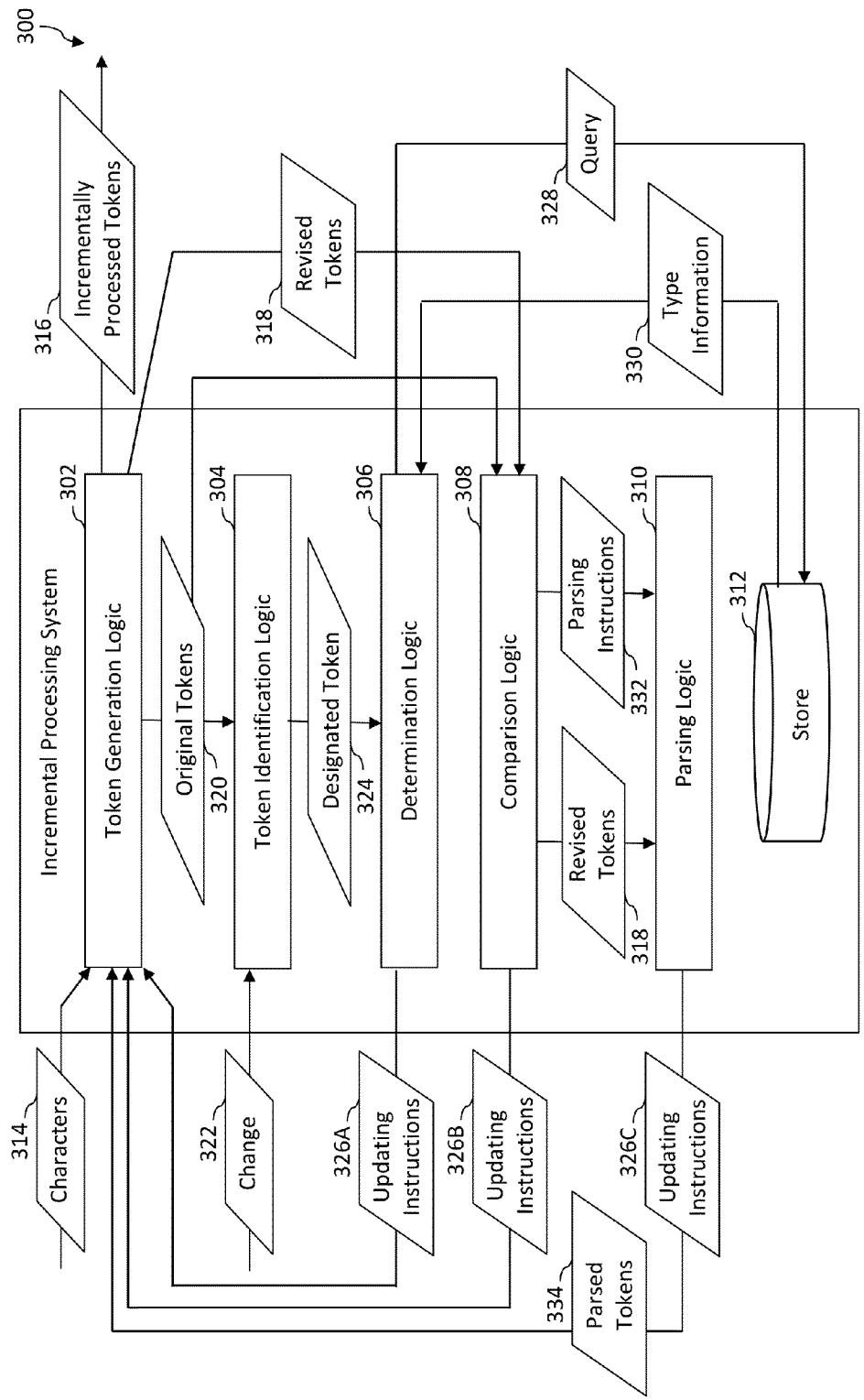
FIG. 3 is a block diagram of an example incremental processing system in accordance with an embodiment.

FIGS. 1A and 1B depict respective portions of a flowchart 100 of an example method for incrementally processing a style sheet in accordance with an embodiment. FIG. 2 depicts a flowchart 200 of another example method for incrementally processing a style sheet in accordance with an embodiment. For illustrative purposes, flowcharts 100 and 200 are described with respect to an incremental processing system 300 shown in FIG. 3. As shown in FIG. 3, incremental processing system 300 includes token generation logic 302, token identification logic 304, determination logic 306, comparison logic 308, parsing logic 310, and store 312. Further structural and operational embodiments will be apparent to persons skilled in the relevant art(s) based on the discussion regarding flowcharts 100 and 200.

As shown in FIG. 1A, the method of flowchart 100 begins at step 102. In step 102, a sequence of tokens is generated. Each token is an integer representation of a respective sequence of characters that is included in a style sheet. Each token corresponds to a respective character position in the style sheet. Each token may indicate any of a variety of attributes of the token. For example, each token may indicate the character position to which the token corresponds. In another example, each token may indicate a type of the token. In accordance with this example, a token may indicate that the token is a comment opening token, a comment closing token, a number token, an identifier token, an open block token, a close block token, a string token, etc. In an example implementation, token generation logic 302 generates original tokens 320 based on characters 314. Each of the original tokens 320 may represent a respective subset of the characters 314.

At step 104, a designated token in the sequence of tokens that includes a user-initiated change is identified. The designated token follows a first subset of the tokens in the sequence of tokens and precedes a second subset of the tokens in the sequence of tokens. For example, the second subset of the tokens may begin with a token that immediately follows the designated token. In accordance with this example, the second subset may end with a last token of the style sheet or another token that is not the last token of the style sheet. In an example implementation, token identification logic 304 identifies a designated token 324 in the original tokens 320 that includes a user-initiated change 322. For instance, token identification logic 304 may receive the change 322, which is to be included in the designated token 324, from the user. Token identification logic 304 may modify the designated token 324 to include the change 322 in response to receipt of the change 322 from the user. The designated token 324 follows a first subset of the original tokens 320 and precedes a second subset of the original tokens 320.

In an example embodiment, a nearest preceding non-alphabetic character with respect to the user-initiated change is identified to determine the character position of the designated token that indicates a beginning of the designated token. Some examples of a non-alphabetic character include but are not limited to whitespace (e.g., one or more spaces, one or more tabs, one or more empty lines, or any combination thereof), a colon, a semi-colon, a curly brace, etc. In accordance with this embodiment, a nearest following non-alphabetic character with respect to the user-initiated change is identified to determine an end of the designated token.

At step 106, a determination is made whether the user-initiated change is identified as a type of change that changes no attributes, other than the character positions, of the tokens in the second subset of the tokens. Some example types of changes that change no attributes, other than the character positions, of the tokens in the second subset of the token include but are not limited to an addition of whitespace with respect to the designated token, a subtraction of whitespace with respect to the designated token, an addition of one or more characters in a comment or a string within the designated token, a subtraction of one or more characters in a comment or a string within the designated token, adding one or more digits in a number within the designated token, subtracting one or more digits in a number within the designated token, etc. Accordingly, a type of the designated token may be taken into consideration to determine whether the user-initiated changed is identified as a type of change that changes no attributes, other than the character positions, of the tokens in the second subset of the tokens. If the user-initiated change is identified as a type of change that changes no attributes, other than the character positions, of the tokens in the second subset of the tokens, flow continues to step 108. Otherwise, flow continues to step 114.

In an example implementation, determination logic 306 determines whether the user-initiated change is identified as a type of change that changes no attributes, other than the character positions, of the tokens in the second subset of the original tokens 320. For instance, determination logic 306 may provide a query 328 to store 312. Store 312 may sore type information 330, which specifies type(s) of change that do not change attributes, other than the character positions, of tokens that follow a token in which the type(s) of change are made. Store 312 may provide the type information 330 to determination logic 306 in response to receipt of the query 328. It will be recognized that store 312 may be included in incremental processing system 300, as shown in FIG. 3, or located externally to (e.g., remotely with respect to) incremental processing system 300. Determination logic 306 may review type information 330 to determine whether the type information 330 specifies the user-initiated change (or a type of change that includes the user-initiated change). In accordance with this implementation, if the type information 330 specifies the user-initiated change (or a type of change that includes the user-initiated change), flow continues to step 108. Otherwise, flow continues to step 114.

At step 108, a determination is made that the second subset of the tokens is not to be re-tokenized. In an example implementation, determination logic 306 determines that the second subset of the original tokens 320 is not to be re-tokenized in response to the user-initiated change being identified as a type of change that changes no attributes, other than the character positions, of the tokens in the second subset of the original tokens 320. Determination logic 306 may provide updating instructions 326A that do not include instructions to re-tokenize the second subset of the original tokens 320 to token generation logic 302.

At step 110, an initial subset of the tokens in the sequence of tokens is not re-tokenized. The initial subset includes the designated token and the second subset of the tokens. In an example implementation, token generation logic 302 does not re-tokenize an initial subset of the original tokens 320 in response to the updating instructions 326A not including instructions to re-tokenize the second subset of the original tokens 320. In accordance with this implementation, the initial subset of the original tokens 320 includes the designated token 324 and the second subset of the original tokens 320.

At step 112, the character positions of the tokens in the second subset of the tokens are updated to take into account the user-initiated change. In an example implementation, token generation logic 302 updates the character positions of the tokens in the second subset of the original tokens 320 to take into consideration the user-initiated change. Upon completion of step 112, flow continues to step 114, which is shown in FIG. 1B.

At step 114, the first subset of the tokens, the designated token, and the second subset of the tokens having the updated character positions are combined to provide incrementally processed tokens. In an example implementation, token generation logic 302 combines the first subset of the original tokens 320, the designated token 324, and the second subset of the original tokens 320 having the updated character positions to provide incrementally processed tokens 316. Upon completion of step 114, flowchart 100 ends.

At step 116, a determination is made that the second subset of the tokens is to be re-tokenized. In an example implementation, determination logic 306 determines that the second subset of the original tokens 320 is to be re-tokenized in response to the user-initiated change not being identified as a type of change that changes no attributes, other than the character positions, of the tokens in the second subset of the original tokens 320. Determination logic 306 may provide updating instructions 326A that include instructions to re-tokenize the second subset of the original tokens 320 to token generation logic 302.

At step 118, the initial subset of the tokens, which includes the designated token and the second subset of the tokens, is re-tokenized to provide revised token(s). For example, the initial subset of the tokens and not the first subset of the tokens may be re-tokenized. In an example implementation, token generation logic 302 re-tokenizes the initial subset of the original tokens 320 in response to the updating instructions 326A including instructions to re-tokenize the initial subset of the original tokens 320.

At step 120, the initial subset of the tokens is compared to the revised token(s) to determine whether a structure of the revised token(s) differs from a structure of the initial subset of the tokens. In an example implementation, comparison logic 308 compares the initial subset of the original tokens 320 and the revised tokens 318 to determine whether a structure of the revised tokens 318 differs from a structure of the initial subset of the original tokens 320. For instance, comparison logic 308 may receive the initial subset of the original tokens 320 and the revised tokens 318 from token generation logic 302. Upon completion of step 118, flow continues to step 122, which is shown in FIG. 1B.

At step 122, a determination is made whether the structure of the revised token(s) differs from the structure of the initial subset. In an example implementation, comparison logic 308 determines whether the structure of the revised tokens 318 differs from the structure of the initial subset of the original tokens 320. If the structure of the revised token(s) differs from the structure of the initial subset, flow continues to step 124. Otherwise, flow continues to step 128.

At step 124, the revised token(s) are parsed to provide parsed token(s). For instance, the revised token(s) and not the first subset of the tokens may be parsed. In an example implementation, comparison logic 308 provides the revised tokens 318 and parsing instructions 332 to parsing logic 310. The parsing instructions 332 instruct parsing logic 310 to parse the revised tokens 318. Parsing logic 308 parses the revised tokens 318 to provide parsed tokens 334 in response to receipt of the parsing instructions 332 and the revised tokens 318 from comparison logic 308. Parsing logic 310 provides the parsed tokens 334 and updating instructions 326C to token generation logic 302. The updating instructions 326C instruct token generation logic 302 to assign character positions to the parsed tokens 334.

At step 126, character positions are assigned to the parsed token(s) to provide assigned token(s). In an example implementation, token generation logic 302 assigns character positions to parsed tokens 334 to provide assigned tokens based on updating instructions 326C. Upon completion of step 126, flow continues to step 132.

At step 128, the revised token(s) are not parsed. For instance, neither the revised token(s) nor the first subset of the tokens may be parsed. In an example implementation, parsing logic 310 does not parse the revised tokens 318. For instance, comparison logic 308 may provide updating instructions 326B to token generation logic 302 in lieu of providing the revised tokens 318 and the parsing instructions 332 to parsing logic 310. Updating instructions 326B instruct token generation logic 302 to assign character positions to the revised token(s) 318.

At step 130, character positions are assigned to the revised token(s) to provide assigned token(s). In an example implementation, token generation logic 302 assigns character positions to revised tokens 318 to provide assigned tokens based on updating instructions 326B. Upon completion of step 130, flow continues to step 132.

At step 132, the first subset of the tokens and the assigned token(s) are combined to provide the incrementally processed tokens. In an example implementation, token generation logic 302 combines the first subset of the original tokens 320 and the assigned tokens, which are based on the revised tokens 318 or the parsed tokens 334, to provide the incrementally processed tokens 316. Upon completion of step 132, flowchart 100 ends.

In some example embodiments, one or more steps 102, 104, 106, 108, 110, 112, 114, 116, 118, 120, 122, 124, 126, 128, 130, and/or 132 of flowchart 100 may not be performed. Moreover, steps in addition to or in lieu of steps 102, 104, 106, 108, 110, 112, 114, 116, 118, 120, 122, 124, 126, 128, 130, and/or 132 may be performed.

In accordance with some example embodiments, tokens are arranged among hierarchical node trees and are processed accordingly. An example of a hierarchical node tree is shown below for illustrative purposes:

```
.a
{
color: red;
background-color: blue;
}
```

In this example, the hierarchical node tree has a root node and four child nodes. In particular, ".a" is the root node, "{" is the first child node, "color: red;" is the second child node, "background-color: blue;" is the third child node, and "}" is the fourth child node. The second and third child nodes in this example are referred to as declarations. Each declaration has four child elements: a property name, a colon separator, a property value, and a terminating semicolon. Each node has a corresponding character position in the style sheet. The character position that corresponds to the root node may be an absolute character position (i.e., a character position that is relative to the beginning of the style sheet). The character positions that correspond to the respective child nodes may be relative character positions (e.g., offsets) with respect to the absolute character position of the root node.

In accordance with these embodiments, a changed token (e.g., element) may be located using a tree search. For instance, a tree search does not involve a character-by-character text comparison and may therefore be more efficient than a linear array search. Once a changed token is located, a character position of a child node that includes the changed token and character positions of respective subsequent child nodes in the same hierarchical node tree (referred to herein as a "changed hierarchical node tree") may be updated, along with character positions of root nodes of respective hierarchical node trees that follow the changed hierarchical node tree. For instance, character positions of child nodes in the hierarchical node trees that follow the changed hierarchical node tree may not be updated.

To illustrate this point, consider the following two hierarchical node trees:

```
.a
{
color: red;
background-color: blue;
}
.br
{
color: green;
background-color: yellow;
}
```

If a user adds a line break after "red;" in the first hierarchical node tree, character positions of the third and fourth child nodes of the first hierarchical node tree may be incremented by one, and the character position of the root node ".br" in the second hierarchical node tree may be incremented by one. Character positions of the first and second child nodes of the first hierarchical node tree and character positions of the child nodes of the second hierarchical node tree need not be updated in accordance with some example embodiments.

As shown in FIG. 2, the method of flowchart 100 begins at step 202. In step 202, specified subsets of tokens from a sequence of tokens are assigned to respective hierarchical node trees. Each hierarchical node tree is defined by hierarchical levels that include nodes among which the tokens in the respective specified subset are included. Each of the hierarchical nodes has a respective character position that indicates a position of that node in the style sheet. In an example implementation, token generation logic 302 assigns specified subsets of the original tokens 320 to respective hierarchical node trees.

At step 204, in a changed hierarchical node tree having a root node and sub-root node(s), character position(s) of the sub-root node(s) that follow a sub-root node that includes the user-initiated change are updated, and a character position of the root node is not updated. In an example implementation, token generation logic 302 updates character position(s) of the sub-root node(s) in the changed hierarchical node tree that follow the sub-root node that includes the user-initiated change in the hierarchical node tree. In accordance with this implementation, token generation logic 302 does not update the character position of the root node in the changed hierarchical node tree.

At step 206, in each hierarchical node tree that follows the changed hierarchical node tree, a character position of a root node is updated, and relative character positions of sub-root nodes are not updated, to take into account the user-initiated change. In an example implementation, token generation logic 302 updates a character position of a root node in each hierarchical node tree that follows the changed hierarchical node tree to take into consideration the user-initiated change. In accordance with this implementation, token generation logic 302 does not update relative character positions of the sub-root nodes to take into consideration the user-initiated change.

In some example embodiments, one or more steps 202, 204, and/or 206 of flowchart 200 may not be performed. Moreover, steps in addition to or in lieu of steps 202, 204, and/or 206 may be performed.

Any one or more steps of flowchart 200 may be performed in conjunction with any one or more steps of flowchart 100. For example, step 202 of flowchart 200 may be performed in response to step 102 of flowchart 100. In another example, step 204 and/or step 206 of flowchart 200 may be incorporated into any of steps 112, 126, and/or 130 of flowchart 100. Moreover, any step(s) of flowchart 100 and/or step(s) of flowchart 200 may be performed in conjunction with other techniques for incrementally processing a style sheet, such as the techniques described in U.S. Pat. No. 7,596,747, entitled "Incrementally Parsing Style Sheets" and issued on Sep. 29, 2009, the entirety of which is incorporated herein by reference.

It will be recognized that incremental processing system 300 may not include one or more of token generation logic 302, token identification logic 304, determination logic 306, comparison logic 308, parsing logic 310, and/or store 312. Furthermore, incremental processing system 300 may include modules in addition to or in lieu of token generation logic 302, token identification logic 304, determination logic 306, comparison logic 308, parsing logic 310, and/or store 312.

Token generation logic 302, token identification logic 304, determination logic 306, comparison logic 308, parsing logic 310, and flowcharts 100 and 200 may be implemented in hardware, software, firmware, or any combination thereof. For example, token generation logic 302, token identification logic 304, determination logic 306, comparison logic 308, parsing logic 310, flowchart 100, and/or flowchart 200 may be implemented as computer program code configured to be executed in one or more processors. In another example, token generation logic 302, token identification logic 304, determination logic 306, comparison logic 308, parsing logic 310, flowchart 100, and/or flowchart 200 may be implemented as hardware logic/electrical circuitry. For instance, in an embodiment, one or more of token generation logic 302, token identification logic 304, determination logic 306, comparison logic 308, parsing logic 310, flowchart 100, and/or flowchart 200 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 4:
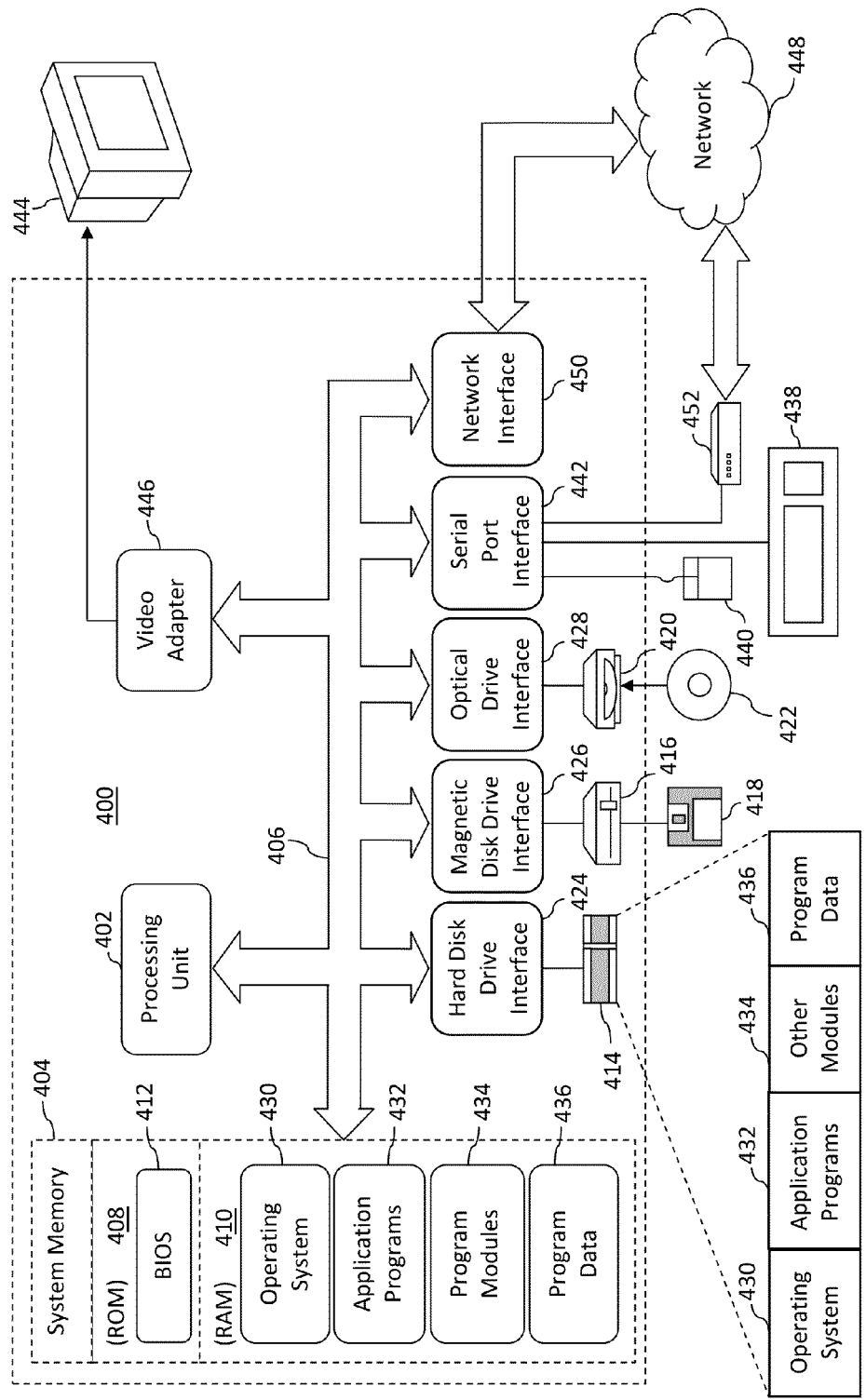
FIG. 4 depicts an example computer in which embodiments may be implemented.

FIG. 4 depicts an example computer 400 in which embodiments may be implemented. Incremental processing system 300 shown in FIG. 1 (or any one or more subcomponents thereof) may be implemented using computer 400, including one or more features of computer 400 and/or alternative features. Computer 400 may be a general-purpose computing device in the form of a conventional personal computer, a mobile computer, or a workstation, for example, or computer 400 may be a special purpose computing device. The description of computer 400 provided herein is provided for purposes of illustration, and is not intended to be limiting. Embodiments may be implemented in further types of computer systems, as would be known to persons skilled in the relevant art(s).

As shown in FIG. 4, computer 400 includes a processing unit 402, a system memory 404, and a bus 406 that couples various system components including system memory 404 to processing unit 402. Bus 406 represents one or more of any of several types of bus structures, including a memory bus or memory controller, a peripheral bus, an accelerated graphics port, and a processor or local bus using any of a variety of bus architectures. System memory 404 includes read only memory (ROM) 408 and random access memory (RAM) 410. A basic input/output system 412 (BIOS) is stored in ROM 408.

Computer 400 also has one or more of the following drives: a hard disk drive 414 for reading from and writing to a hard disk, a magnetic disk drive 416 for reading from or writing to a removable magnetic disk 418, and an optical disk drive 420 for reading from or writing to a removable optical disk 422 such as a CD ROM, DVD ROM, or other optical media. Hard disk drive 414, magnetic disk drive 416, and optical disk drive 420 are connected to bus 406 by a hard disk drive interface 424, a magnetic disk drive interface 426, and an optical drive interface 428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 430, one or more application programs 432, other program modules 434, and program data 436. Application programs 432 or program modules 434 may include, for example, computer program logic for implementing token generation logic 302, token identification logic 304, determination logic 306, comparison logic 308, parsing logic 310, flowchart 100 (including any step of flowchart 100), and/or flowchart 200 (including any step of flowchart 200), as described herein.

A user may enter commands and information into the computer 400 through input devices such as keyboard 438 and pointing device 440. Other input devices (not shown) may include a microphone, joystick, game pad, satellite dish, scanner, or the like. These and other input devices are often connected to the processing unit 402 through a serial port interface 442 that is coupled to bus 406, but may be connected by other interfaces, such as a parallel port, game port, or a universal serial bus (USB).

A display device 444 (e.g., a monitor) is also connected to bus 406 via an interface, such as a video adapter 446. In addition to display device 444, computer 400 may include other peripheral output devices (not shown) such as speakers and printers.

Computer 400 is connected to a network 448 (e.g., the Internet) through a network interface or adapter 450, a modem 452, or other means for establishing communications over the network. Modem 452, which may be internal or external, is connected to bus 406 via serial port interface 442.

As used herein, the terms "computer program medium" and "computer-readable medium" are used to generally refer to media such as the hard disk associated with hard disk drive 414, removable magnetic disk 418, removable optical disk 422, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 432 and other program modules 434) may be stored on the hard disk, magnetic disk, optical disk, ROM, or RAM. Such computer programs may also be received via network interface 450 or serial port interface 442. Such computer programs, when executed or loaded by an application, enable computer 400 to implement features of embodiments discussed herein. Accordingly, such computer programs represent controllers of the computer 400.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
   generating a sequence of tokens, each token being an integer representation of a respective sequence of characters that is included in a style sheet, each token corresponding to a respective character position that indicates a position of that token in the style sheet;
   identifying a designated token in the sequence of tokens that includes a user-initiated change, the designated token following a first subset of the tokens in the sequence of tokens and preceding a second subset of the tokens in the sequence of tokens;
   determining whether the user-initiated change is identified as a type of change that changes no attributes, other than the character positions, of the tokens in the second subset of the tokens; and
   determining whether the second subset of the tokens is to be re-tokenized, including:
      determining that the second subset of the tokens is not to be re-tokenized if the user-initiated change is identified as a type of change that changes no attributes, other than the character positions, of the tokens in the second subset of the tokens, but determining that the second subset of the tokens is to be re-tokenized if the user-initiated change is not identified as a type of change that changes no attributes, other than the character positions, of the tokens in the second subset of the tokens.

2. The method of claim 1, wherein determining whether the user-initiated change is identified as a type of change that changes no attributes, other than the character positions, of the tokens in the second subset of the tokens, comprises:
   determining that the user-initiated change is an addition or a subtraction of whitespace with respect to the designated token;
   wherein determining whether the second subset of the tokens is to be re-tokenized, comprises:
      determining that the second subset of the tokens is not to be re-tokenized in response to determining that the user-initiated change is an addition or a subtraction of whitespace with respect to the designated token; and
   wherein the method further comprises:
      updating the character positions of the tokens in the second subset of the tokens to take into consideration the user-initiated change.

3. The method of claim 1, wherein determining whether the user-initiated change is identified as a type of change that changes no attributes, other than the character positions, of the tokens in the second subset of the tokens, comprises:
   determining that the user-initiated change is at least one of an addition of at least one character or a subtraction of at least one character in a comment or a string within the designated token;
   wherein determining whether the second subset of the tokens is to be re-tokenized, comprises:
      determining that the second subset of the tokens is not to be re-tokenized in response to determining that the user-initiated change is at least one of an addition of at least one character or a subtraction of at least one character in a comment or a string within the designated token; and
   wherein the method further comprises:
      updating the character positions of the tokens in the second subset of the tokens to take into consideration the user-initiated change.

4. The method of claim 1, wherein determining whether the user-initiated change is identified as a type of change that changes no attributes, other than the character positions, of the tokens in the second subset of the tokens comprises:
   determining that the user-initiated change is not identified as a type of change that changes no attributes, other than the character positions, of the tokens in the second subset of the tokens;
   wherein determining whether the second subset of the tokens is to be re-tokenized comprises:
      determining that the second subset of the tokens is to be re-tokenized in response to determining that the user-initiated change is not identified as a type of change that changes no attributes, other than the character positions, of the tokens in the second subset of the tokens; and wherein the method further comprises:

re-tokenizing an initial subset of the tokens in the sequence of tokens to provide one or more revised tokens, the initial subset of the tokens including the designated token and the second subset of the tokens;

comparing the initial subset of the tokens to the one or more revised tokens to determine whether a structure of the one or more revised tokens differs from a structure of the initial subset of the tokens; and parsing the one or more revised tokens if the structure of the one or more revised tokens differs from the structure of the initial subset, but not parsing the one or more revised tokens if the structure of the one or more revised tokens is same as the structure of the initial subset.

5. The method of claim 4, wherein re-tokenizing the initial subset of the tokens comprises:

re-tokenizing the initial subset of the tokens and not the first subset of the tokens in the sequence of tokens to provide the one or more revised tokens.

6. The method of claim 4, wherein parsing the one or more revised tokens if the structure of the one or more revised tokens differs from the structure of the initial subset, but not parsing the one or more revised tokens if the structure of the one or more revised tokens is same as the structure of the initial subset, comprises:

parsing the one or more revised tokens and not the first subset of the tokens if the structure of the one or more revised tokens differs from the structure of the initial subset, but parsing neither the one or more revised tokens nor the first subset of the tokens if the structure of the one or more revised tokens is same as the structure of the initial subset.

7. The method of claim 4, wherein identifying the designated token comprises:

identifying a nearest preceding non-alphabetic character with respect to the user-initiated change to determine the character position of the designated token that indicates a beginning of the designated token; and identifying a nearest following non-alphabetic character with respect to the user-initiated change to determine an end of the designated token.

8. The method of claim 4, wherein the second subset of the tokens begins with a token that immediately follows the designated token and ends with a last token of the style sheet.

9. The method of claim 1, further comprising:

assigning a plurality of specified subsets of the tokens that are included in the sequence of tokens to a plurality of respective hierarchical node trees, each hierarchical node tree defined by a plurality of hierarchical levels that includes a plurality of respective subsets of a plurality of nodes among which the tokens in the respective specified subset are included, each node in the plurality of nodes having a respective character position that indicates a position of that node in the style sheet.

10. The method of claim 9, wherein determining whether the user-initiated change is identified as a type of change that changes no attributes, other than the character positions, of the tokens in the second subset of the tokens comprises:

determining that the user-initiated change is identified as a type of change that changes no attributes, other than the character positions, of the tokens in the second subset of the tokens;

wherein determining whether the second subset of the tokens is to be re-tokenized comprises:

determining that the second subset of the tokens is not to be re-tokenized in response to determining that the user-initiated change is identified as a type of change that changes no attributes, other than the character positions, of the tokens in the second subset of the tokens;

wherein the plurality of nodes in each hierarchical node tree includes a root node and one or more non-root nodes, the one or more non-root nodes having relative character positions which are defined relative to the character position of the respective root node; and wherein the method further comprises:

updating the character position of the root node and not the relative character positions of the one or more non-root nodes in each hierarchical node tree that follows a hierarchical node tree that includes the user-initiated change to take into account the user-initiated change in response to determining that the second subset of the tokens is not to be re-tokenized.

11. The method of claim 10, further comprising:

updating the relative character positions of sub-root nodes that follow a sub-root node that includes the user-initiated change in a specified hierarchical node tree to take into consideration the user-initiated change; and not updating the character position of the root node in the specified hierarchical node tree.

12. A system comprising:

token generation logic configured to generate a sequence of tokens using at least one processor, each token being an integer representation of a respective sequence of characters that is included in a style sheet, each token corresponding to a respective character position that indicates a position of that token in the style sheet;

token identification logic configured to identify a designated token in the sequence of tokens that includes a user-initiated change, the designated token following a first subset of the tokens in the sequence of tokens and preceding a second subset of the tokens in the sequence of tokens; and determination logic configured to determine whether the user-initiated change is identified as a type of change that changes no attributes, other than the character positions, of the tokens in the second subset of the tokens, the determination logic further configured to determine that the second subset of the tokens is not to be re-tokenized in response to the user-initiated change being identified as a type of change that changes no attributes, other than the character positions, of the tokens in the second subset of the tokens, the determination logic further configured to determine that the second subset of the tokens is to be re-tokenized in response to the user-initiated change not being identified as a type of change that changes no attributes, other than the character positions, of the tokens in the second subset of the tokens.

13. The system of claim 12, wherein the determination logic is configured to determine that the user-initiated change is an addition or a subtraction of whitespace with respect to the designated token;

wherein the determination logic is configured to determine that the second subset of the tokens is not to be re-tokenized in response to the user-initiated change being an addition or a subtraction of whitespace with respect to the designated token; and wherein the token generation logic is further configured to update the character positions of the tokens in the second subset of the tokens to take into consideration the user-initiated change.

14. The system of claim 12, wherein the determination logic is configured to determine that the user-initiated change is at least one of an addition of at least one character or a subtraction of at least one character in a comment or a string within the designated token;
wherein the determination logic is configured to determine that the second subset of the tokens is not to be re-tokenized in response to the user-initiated change being at least one of an addition of at least one character or a subtraction of at least one character in a comment or a string within the designated token; and
wherein the token generation logic is further configured update the character positions of the tokens in the second subset of the tokens to take into consideration the user-initiated change.

15. The system of claim 12, wherein the token generation logic is further configured to re-tokenize an initial subset of the tokens in the sequence of tokens to provide one or more revised tokens in response to a determination that the second subset of the tokens is to be re-tokenized, the initial subset of the tokens including the designated token and the second subset of the tokens; and
wherein the system further comprises:
comparison logic configured to compare the initial subset of the tokens to the one or more revised tokens to determine whether a structure of the one or more revised tokens differs from a structure of the initial subset of the tokens; and
parsing logic configured to parse the one or more revised tokens in response to the structure of the one or more revised tokens differing from the structure of the initial subset, the parsing logic further configured to not parse the one or more revised tokens in response to the structure of the one or more revised tokens being same as the structure of the initial subset.

16. The system of claim 15, wherein the token generation logic is configured to re-tokenize the initial subset of the tokens and not the first subset of the tokens in the sequence of tokens to provide the one or more revised tokens.

17. The system of claim 15, wherein the parsing logic is configured to parse the one or more revised tokens and not the first subset of the tokens in response to the structure of the one or more revised tokens differing from the structure of the initial subset; and
wherein the parsing logic is configured to parse neither the one or more revised tokens nor the first subset of the tokens in response to the structure of the one or more revised tokens being same as the structure of the initial subset.

18. The system of claim 12, wherein the token generation logic is further configured to assign a plurality of specified subsets of the tokens that are included in the sequence of tokens to a plurality of respective hierarchical node trees, each hierarchical node tree defined by a plurality of hierarchical levels that includes a plurality of respective subsets of a plurality of nodes among which the tokens in the respective specified subset are included, each node in the plurality of nodes having a respective character position that indicates a position of that node in the style sheet.

19. The system of claim 18, wherein the plurality of nodes in each hierarchical node tree includes a root node and one or more non-root nodes, the one or more non-root nodes having relative character positions which are defined relative to the character position of the respective root node;
wherein the token generation logic is further configured to update the character position of the root node and not the relative character positions of the one or more non-root nodes in each hierarchical node tree that follows a specified hierarchical node tree that includes the user-initiated change to take into account the user-initiated change in response to a determination that the second subset of the tokens is not to be re-tokenized; and
wherein the token generation logic is further configured to update the relative character positions of sub-root nodes that follow a sub-root node that includes the user-initiated change but not the character position of the root node in the specified hierarchical node tree to take into account the user-initiated change in response to a determination that the second subset of the tokens is not to be re-tokenized.

20. A computer program product comprising a computer-readable storage medium having computer program logic recorded thereon for enabling a processor-based system to incrementally process a style sheet, the computer program product comprising:
a first program logic module for enabling the processor-based system to generate a sequence of tokens, each token being an integer representation of a respective sequence of characters that is included in a style sheet;
a second program logic module for enabling the processor-based system to assign specified subsets of the sequence of tokens to respective hierarchical node trees, each hierarchical node tree defined by a plurality of hierarchical levels that includes a plurality of respective subsets of a plurality of nodes among which the tokens in the respective specified subset are included, each node in the plurality of nodes having a respective character position that indicates a position of that node in the style sheet;
a third program logic module for enabling the processor-based system to identify a designated token that includes a user-initiated change in a designated hierarchical node tree, the designated token included in a designated node following a first subset of the plurality of nodes in the designated hierarchical node tree and preceding a second subset of the plurality of nodes in the designated hierarchical node tree;
a fourth program logic module for enabling the processor-based system to determine whether the user-initiated change is identified as a type of change that changes no attributes, other than the character positions, of the nodes in the second subset of the plurality of nodes in the designated hierarchical node tree; and
a fifth program logic module for enabling the processor-based system to determine that the tokens in the second subset of the plurality of nodes in the designated hierarchical node tree are not to be re-tokenized in response to the user-initiated change being identified as a type of change that changes no attributes, other than the character positions, of the nodes in the second subset of the plurality of nodes in the designated hierarchical node tree and for enabling the processor-based system to determine that the tokens in the second subset of the plurality of nodes in the designated hierarchical node tree are to be re-tokenized in response to the user-initiated change not being identified as a type of change that changes no attributes, other than the character positions, of the nodes in the second subset of the plurality of nodes in the designated hierarchical node tree.

* * * * *